Patented July 31, 1945

2,380,484

UNITED STATES PATENT OFFICE

2,380,484
STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,752

4 Claims. (Cl. 260—397.4)

This invention relates to the preparation of new compounds of the pregnane series. These compounds are useful intermediates in the preparation of hormone products.

In the copending Patent No. 2,352,052, issued July 4, 1944, a method was described by which steroidal sapogenins may be isomerized to pseudosapogenins and these pseudo-sapogenins further mildly oxidized and hydrolyzed to give 16-17 unsaturated 20 keto pregnane series compounds. The transformations may be indicated as follows:

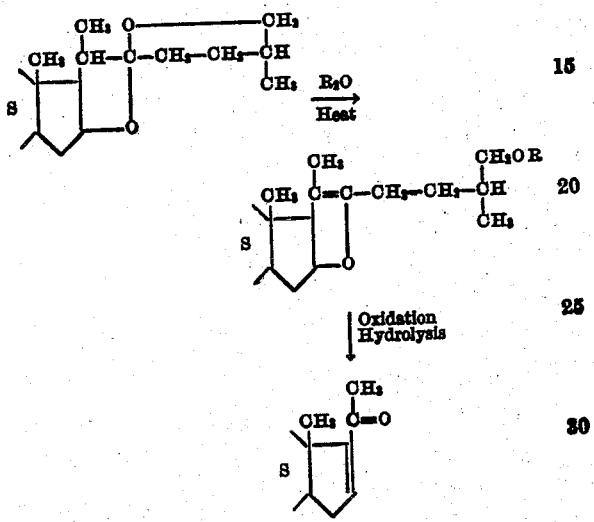

where S represents the rings A, B and C of the steroid nucleus and R is an acyl radical ($R_2O$ representing an acyl anhydride).

I have now found that these reactions may also be applied to the newly discovered steroidal sapogenins yuccagenin and lilagenin which are described in my copending application, Serial No. 535,748, filed May 15, 1944. The corresponding pseudogenin is described in my copending application, Serial No. 535,753, filed May 15, 1944.

Since yuccagenin and lilagenin are isomeric, differing only in the configuration of the side chain, both compounds give pseudo-yuccagenin.

*Oxidation of pseudoyuccagenin triacetate.*—To a solution of 3 g. of the triacetate of pseudo-yuccagenin in 150 cc. of glacial acetic acid at 25° was added a solution of 1.3 g. chromic anhydride in 15 cc. of 80% acetic acid during ten minutes. The reaction mixture was worked up as described for the oxidation of pseudohecogenin. The acetylated product crystallized from methanol to give 5,16-pregnadien-2,3($\beta$)-diol-20-one diacetate as needles, M. P. 173-181°; yield 0.3 g.

*Anal.*—Calc'd for $C_{25}H_{34}O_5$: C, 72.4; H, 8.3. Found: C, 72.1; H, 8.4.

While the oxidizing agent described, chromic acid in acetic acid at room temperature, is the preferred agent for carrying out this step other agents capable of rupturing a carbon-carbon double bond may also be used for example ozone, per-acids and their salts and the like.

The above described transformations may be illustrated as follows:

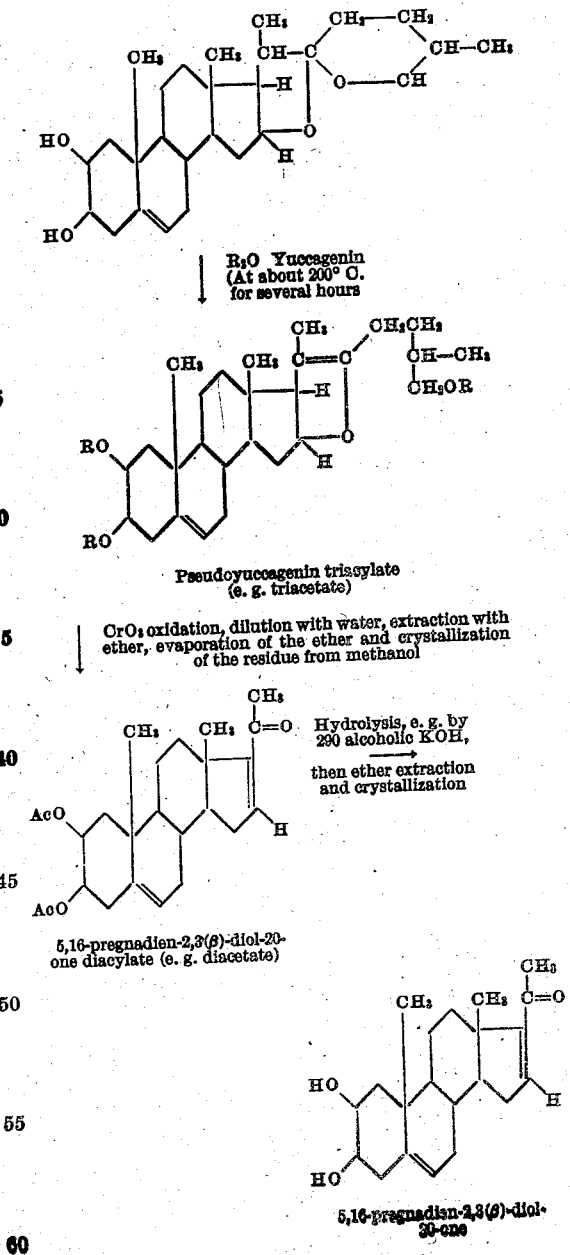

What I claim is:
1. A compound of the formula
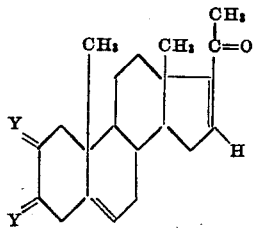
where Y is a member of the class consisting of
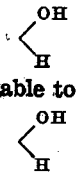
and groups hydrolyzable to
2. 5,16-pregnadien-2,3-diol-20-one diacylates.
3. 5,16-pregnadien-2,3-diol-20-one diacetate.
4. 5,16-pregnadien-2,3-diol-20-one.
ROMEO B. WAGNER.